May 17, 1949. W. T. HONISS 2,470,558
APPARATUS FOR AND METHOD OF FEEDING MOLTEN GLASS
Filed July 7, 1943
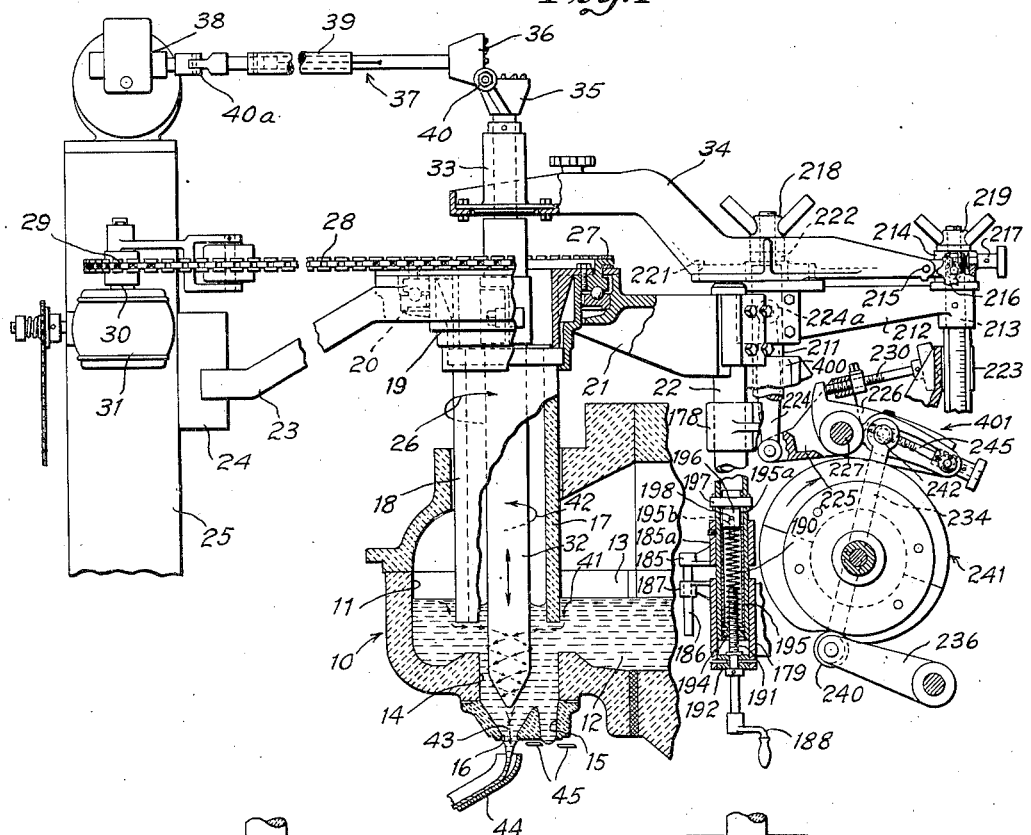
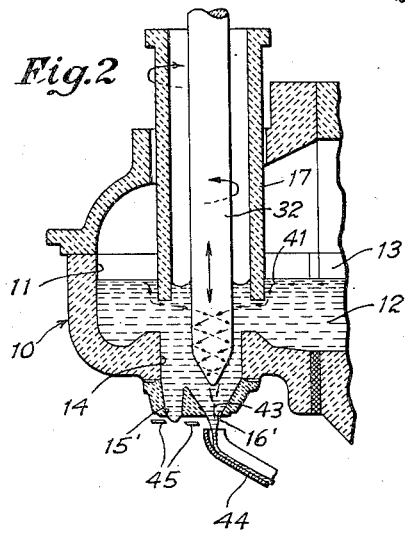
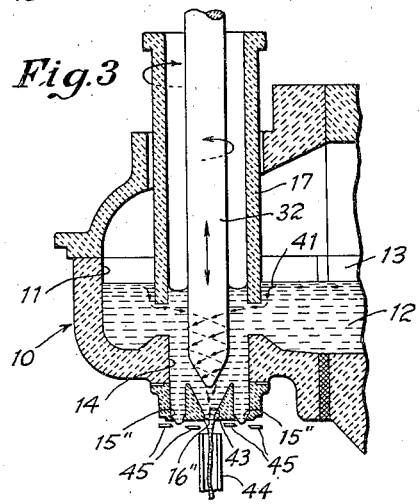
Witness:
A. A. Horn
Inventor:
William T. Honiss
by Brown & Parham
Attorneys.

Patented May 17, 1949

2,470,558

UNITED STATES PATENT OFFICE 2,470,558

APPARATUS FOR AND METHOD OF FEEDING MOLTEN GLASS

William T. Honiss, West Hartford, Conn., assignor to Hartford-Empire Company, Hartford, Conn., a corporation of Delaware Application July 7, 1943, Serial No. 493,699

13 Claims. (Cl. 49—55)

The invention relates generally to improvements in apparatus for and methods of feeding molten glass. It relates more particularly to improvements in glass feeding apparatus of the type having a glass feed outlet through which glass tends to flow from a supply body by which such outlet is continuously submerged, and to methods of glass feeding which may be performed by the use of such an apparatus.

An important object of the invention is to provide a glass feeding apparatus of the character described, having novel means for eliminating cords from the glass passing from the supply body to the feed outlet of such apparatus.

Another object of the invention is to provide a method of feeding molten glass from a supply body through an outlet at the bottom of a chamber which contains the supply body so as to divert from the glass passing to the feed outlet cords which otherwise would be included in the glass issuing from such outlet.

Cords in the glass of a supply body are the result of inhomogeneity. They may differ in kind and origin. Thus, cords may be caused by concentrations of oxides or foreign matter in the glass, by erosion of refractory walls of the glass holding container and the taking into the glass of alumina from the refractory, by devitrification of a portion of the glass or in general by local and extreme differences in composition and/or temperature between different portions of the glass. The problem of adequately disposing of cords therefore is practically ever-present in the operation of the glass feeding forehearth or container of the bottom feed outlet type, such as that with which the present invention is more particularly concerned. It also is of importance in the operation of other types of glass delivery apparatus.

The use to which the glass being fed is to be put is an important factor in a determination of the adequacy of the method and means employed to dispose of cords in such glass. Thus, optical glass, for example, would be rendered unfit for use by the presence therein of cords which are so slight as to be merely undesirable in glass intended for a different use. Also, the required treatment and conditioning in a glass feeding forehearth or container of one kind of glass may produce in such glass more cords or different cords than would be produced in another kind of glass in like circumstances. So far as I am aware, glass satisfactory for optical purposes has not been fed or delivered by an outlet type glass feeder prior to the present invention, primarily because it was impossible previously adequately to dispose of cords which appeared to form at the surface or in the upper layer of the glass in available glass feeding apparatus and which, despite the use of available glass stirring means, would persist in the glass passing to and through the glass feed outlet of such an apparatus.

While stirring of the glass of the supply body in a bottom outlet type of feeder is comparatively effective in disposing of such cords as can be acted on by the stirring means when the cords are located at a substantial depth in the glass of the supply body and at a substantial distance from the feed outlet, I have found that the lighter weight cords which first appear on or near the surface of the glass of the supply body nearer to the feed outlet, as has been noted particularly in the case of optical glass, cannot be entirely eliminated or disposed of by the use of any stirring means or methods known to me prior to the present invention. Such cords may of course be substantially reduced and attenuated by prior stirring means before they arrive at the feed outlet. This, however, is not enough to make the glass fed satisfactory for certain intended uses, as for optical use.

The present invention provides a glass feeding apparatus of the bottom feed outlet type having special provisions which enable it to cope successfully with cords of the kind which previously had stood in the way of successful feeding of optical glass by a feeder of that type.

According to the present invention, an auxiliary orifice, which may be termed a cord removing outlet, may be provided in the bottom of the glass feeding chamber adjacent to the orifice which constitutes the feed outlet of the feeding apparatus. These two adjacent orifices may be formed in the bottom wall of a well at the bottom of the glass feeding chamber. Glass feed controlling means may be provided and used according to the present invention to direct to the auxiliary orifice cords from the glass supply body which otherwise would pass to the feed outlet. At the same time, glass free from such cords will be directed to and through the feed outlet.

Controlled feeding of glass through the adjacent feed and auxiliary orifices to accomplish the useful result above mentioned may be effected by providing control means including a rotating refractory tube in the glass supply body above the well containing the adjacent orifices and in axial alignment with the auxiliary orifice. The feed control means may also include a reciprocating and rotating refractory plunger disposed within and concentric with the rotating refractory tube and in axial alignment with the auxiliary orifice. The position of the lower end of the rotating refractory tube with relation to the upper end of the well may be selected to regulate as desired flow of glass from the supply body into the well and hence to both the feed orifice and the adjacent auxiliary orifice. The position, amplitude, speed and frequency of the working strokes of the plunger may all be selected to impart the desired flow accelerating and retarding impulses to the glass streams in the orifices in the bottom of the well. These impulses will be relatively greater at the auxiliary orifice, with which the plunger is axially aligned, than at the feed orifice. The plunger may be kept continuously stationary in alignment with the auxiliary orifice if service requirements relating to the glass issuing from the feed orifice will permit. If the plunger is rotated, the direction of rotation thereof preferably is the reverse of that of the refractory tube.

The cords in the surface portion of the glass supply body may have been attenuated and broken up or dispersed as much as possible by any suitable known stirrers before they reach the vicinity of the refractory tube if they have been formed farther back in the glass feeding structure. As the tube rotates, cords arriving in the vicinity thereof will be drawn to and gradually work downwardly along the outer surface of the rotating tube to the lower end thereof. Thence, the cords will pass to the surface of the plunger and downwardly along the latter to the lower end thereof. The plunger preferably is tapered to a relatively sharp point. The cords will leave this relatively sharp point and pass downwardly along approximately the extended center line of the plunger into and through the aligned auxiliary orifice.

The glass issuing from the auxiliary orifice, containing the cords, may be collected in any suitable way and subsequently broken up and used as cullet or put to any other suitable use.

The glass issuing from the feed outlet may form successive suspended masses below the outlet and successive charges or blanks may be severed therefrom. Such charges or blanks may be delivered to a suitable forming machine, if the glass being fed is to be made into containers, or may be further acted upon as may be required in the manufacture of optical glass objects if the glass being fed is optical glass. The glass passing to the feed orifice may be fed therefrom in a continuous stream and any suitable known use may be made of such a stream.

Further objects and advantages of the invention will hereinafter be pointed out or will be obvious from the following description of particular illustrative embodiments of the invention, as shown in the accompanying drawings, in which:

Figure 1 is a view, partly in vertical section and partly in side elevation, showing the outer or feeding end portion of a glass feeding forehearth equipped with glass feed controlling and cord removing means of the present invention;

Fig. 2 is a vertical sectional view of the outer end portion of a glass feeding forehearth having a specifically different glass feed controlling and cord removing means; and Fig. 3 is a view like Fig. 2 but showing the use of one auxiliary cord removal orifice with two adjacent feed orifices.

In the embodiment of the invention shown in Fig. 1, a glass feeding forehearth 10 has its outer end portion formed to provide a glass feeding chamber 11 to which a supply body of molten glass 12 is conducted by a flow channel 13 from a glass melting tank (not shown) or any other suitable source of supply of molten glass. The forehearth 10 may be of any suitable known construction and may be provided with any suitable known equipment, such as burners, stirrers and other known means, for use in controlling the temperature and condition of the molten glass in the forehearth.

The glass feeding chamber 11 of the forehearth 10 is provided at its bottom with an open-topped well 14 which may be continuously submerged by glass of the supply body. The bottom wall of this well is formed to provide a glass feed orifice 15 and an adjacent auxiliary orifice 16. As shown, the feed orifice 15 is located in the rearward portion of the bottom of the well next to the upstream side of the latter and the auxiliary orifice 16 is located between the vertical center line and the front or downstream side of the well. Also, the wall of the auxiliary orifice 16 may be formed to be upwardly flaring so as to be substantially funnel shaped and to occupy at its upper end a substantially greater part of the cross-sectional area of the well 14 than the upper end of the feed orifice 15. These two orifices may be of approximately the same size at their lower or discharge ends.

A refractory tube 17 depends through a suitable opening 18 in the top structure of the outer end portion of the forehearth into the glass of the supply body above the well 14 so that the lower end of this tube is located at a predetermined, selected height above the upper end of the well. The tube 17 may be mounted in an annular holder 19 which is journaled in an annular bearing member 20 carried by an arm 21 on a vertical rod 22. The vertical rod 22 may be supported for vertical adjustment by any suitable known means. That shown, Fig. 1, is substantially like the means shown for supporting the rod 177 of the generally comparable structure shown in Patent No. 1,760,254, issued May 27, 1930 to K. E. Peiler, Figs. 14, 16 and 18. Such mechanism comprises upper and lower vertically aligned bearings 178 and 179, respectively, in which such rod may move vertically. The rod 22, which is tubular, as shown, carries a transverse pin 197 bearing against a plunger 196 in a sleeve 195 which is slidable in the bore of the tubular rod. A screw 191, journaled in a bushing 192 of the bearing 179 and provided with a crank 188, is threaded through a nut 194 which is fixed in the sleeve 195. A coil spring 190 is interposed between the nut 194 and the plunger 196. With the mechanism just described, the rod 22 may be adjusted vertically by turning the crank 188 and this will adjust the tube 17 vertically in relation to the upper end of the well 14. The sleeve 195 is slotted at 195a to accommodate the transverse pin 197 and also has a vertical slot 195b into which a pin 198 carried by the plunger 196 projects. The sleeve 195 thus may have limited vertical movement relative to the plunger and to the tubular rod. The spring 190 thus may act as a cushion in the motion transmitting connection between the nut 194 and the tubular rod 22 so that the latter, and hence the refractory tube 17, may be raised gradually without damaging it by the yielding but increasing pressure of the spring in the event that the glass into which the tube 17 depends is cool or viscous enough to impede upward movement of such tube. A pin 186, carried by an arm 185 on a collar 185a, fixed to the tubular rod 22, depends slidably through an apertured bracket 187 on the bearing 179 to prevent rotary movement of the rod 22 in the bearings 178 and 179. The annular bearing member 20 may be braced by an arm 23 carrying a slide block 24 which bears against a stationary vertical support 25. The structural arrangement for supporting the refractory tube 17 is such that the tube may be vertically adjusted to permit a selection of the distance between the lower end thereof and the upper end of the well 14 and so that such tube will be rotatably supported in axial alignment with the auxiliary orifice 16. Rotation of the refractory tube 17, as in the direction indicated by the arrow 26, may be effected by any suitable known means. As shown, the upper end of the rotary holder 19 carries a sprocket wheel 27 driven by a chain connection 28 with a sprocket wheel 29 on a shaft 30 that is driven by a motor 31 on the stationary support 25.

A vertically reciprocable refractory implement or plunger 32 depends through the tube 17 into the glass supply body in concentric relation with the tube and in axial alignment with the auxiliary orifice 16. This plunger may be rotatably supported by an annular bearing member 33 which is carried by an arm 34. The arm 34 may be guided and reciprocated vertically by any suitable known means, as by the means shown in Figs. 16 and 22 of the aforesaid Peiler patent for supporting and reciprocating the comparable arm 204 of the feeding structure of the disclosure of that patent.

The means shown in Fig. 1 of the accompanying drawings for supporting and reciprocating the arm 34 is substantially like that disclosed in the aforesaid Peiler patent. Such means comprises a bracket 212 which is clamped at one end on a vertical rod 211 which slides vertically in suitable guide means, represented by the partially shown guide-bearing 409. The arm 34 is adjustably clamped in place on the bracket 212 by tightening a wing nut 218 which is threaded onto the projecting upper end portion of the rod 211 and bears on an interposed clamp 222, such upper end portion of the rod 211 extending above the bracket 212 through a longitudinally extending slot 221 in the arm 34. This construction permits limited horizontal adjustment of the plunger 32, depending from the forward end portion of the arm 34, in any direction by loosening the wing nut 218 and sliding the arm 34 longitudinally on its bracket 212 or swinging it pivotally around the axis of the rod 211, or by a combination of these adjusting movements. The rearward end portion of the bracket carries a post 213 which projects vertically both above and below the bracket, the upper end portion of such post extending loosely through a collar 214 which carries a hinge pin 215 by which the arm 34 is attached at its rearward end to the collar. The collar 214 and the parts connected therewith may be adjusted horizontally in relation to the post 213, and hence in relation to the bracket 212, by means of hand screws 216 and 217 which are threaded into the post 213 at right angles to each other. Each of these screws is rotatably mounted in a horizontally slotted portion of the collar so as to be held against longitudinal movement relative to the collar while being permitted to slide laterally in its slotted portion of the wall of the collar when the other screw is turned about its axis. Thus, by turning the side screw 216, the collar will be shifted laterally relative to the post 213 to swing the arm 34 angularly about the axis of the rod 211 and by turning the end screws 217, the collar will be shifted rearwardly or forwardly to move the arm 34 longitudinally on its bracket 212, the wing nut 218 first having been loosened. A wing nut 219 on the upper end portion of the post 213 may be tightened to maintain the adjustment. The lower end portion of the post 213 depends through a guide-bearing 223.

The bracket 212 and the parts carried thereby may be reciprocated vertically by a motion transmitting mechanism, generally indicated at 401, which is actuated by a cam 241. This motion transmitting mechanism comprises a final link 224 which is pivotally connected at its upper end, at 224a, to the bracket 212; a cam roll 240, carried by a vertically swingable pivoted cam arm 236; and a link 234 pivotally connected at its lower end with the cam arm and pivotally and adjustably connected at its upper end, at 242, with a pivoted arm 226 of an adjustable, two-part lever which includes the pivoted arm 225 with which the lower end of the final link 224 is pivotally connected. The arms 225 and 226 of this two-part lever may be adjusted to angularly different relative positions about the axis of their common pivot shaft 227 by an adjusting screw 230, which adjustably spaces their free ends apart. This adjustment will raise or lower the path of reciprocation of the bracket 212, and hence of the plunger 32, without changing the length of stroke of such plunger. Adjustment of the point of connection of the upper end of the link 234 with the lever arm 226 to vary the effective length of such lever arm may be accomplished by adjustment of the screw 245, whereby to adjust the length of stroke of the plunger 32.

The upper end portion of the plunger 32 carries a gear 35 in mesh with a gear 36 on a rod 37 to which rotation may be imparted by a suitable motor driven driving mechanism, indicated at 38. Such motor driven driving mechanism may be carried by the stationary support 25 and the rod 37 may include a slip joint arrangement, indicated at 39. Universal joint structures, indicated at 40 and 40a, respectively, may be used to maintain the gears 35 and 36 continuously in mesh with each other at all of the vertically different positions of the plunger 32.

In the operation of the feeding apparatus as shown in Fig. 1 and as hereinbefore particularly described, cords from the upper layer or surface portion of the glass supply body 12 will work downwardly close to the outer surface of the submerged lower end portion of the rotating refractory tube 17 to the lower end of that tube and thence inwardly to and downwardly along the surface of the still lower submerged portion of the vertical reciprocatory plunger 32, as indicated by the arrows 41. The rotation of this plunger 32 preferably is opposite to that of the tube 17, being in the direction indicated by the arrow 42. The cords will be wound around this plunger and gradually move downwardly on the surface thereof to and from the tip of its tapering lower end portion, finally passing, as at 43, into the auxiliary orifice. The glass issuing from the auxiliary orifice 16 may be caught by a suitable trough or chute 44 by which it may be conducted to a suitable place, not shown, at which it may be appropriately disposed of. This glass will contain all the cords passing to the well 14 in glass taken from the surface portion of the supply body. The glass passing through the feed orifice 15 therefore will be free from such cords and may be severed into charges or blanks, as by shears represented by the blades 15 or may be put to any other suitable use.

The vertical reciprocations of the plunger may be made use of periodically to accelerate and periodically to retard flow of glass through the orifices at the bottom of the well, as may be deemed desirable in the production of successive similar charge masses in suspension from the feed orifice 15. Good results may be obtained by the use of a stationary plunger having its lower end portion depending into the glass in the well in axial alignment with the auxiliary orifice.

In the structural arrangement shown in Fig. 2, the positions of the feed orifice, indicated at 15' and auxiliary orifice, indicated at 16', at the bottom of the well 14 are reversed, the feed orifice being located at the front of the bottom wall of the well and the auxiliary orifice being located at the rear of the feed orifice. In this arrangement, the tube 17 and the plunger 32 both are located in axial alignment with the auxiliary orifice, as in the case of the previously described structure of Fig. 1. The operation of the structure shown in Fig. 2 will be understood without an explanation thereof, in view of the explanation that already has been given of the operation of the Fig. 1 form of apparatus. The same reference characters have been used to designate like parts shown in the several views.

In the structure shown in Fig. 3, the bottom wall of the well 14 is formed to provide an auxiliary orifice 16" and feed orifices 15" at both the forward and rearward sides thereof. Glass severing means, represented by the shear blades 45 may be provided for each of these feed orifices and there may be as many of these feed orifices arranged around the central auxiliary orifice as can be used efficiently in any particular installation. The refractory tube 17 and the plunger 32 both are axially aligned with the auxiliary orifices 16" in the Fig. 3 form of apparatus, as in each of the previously described structures. In this form of the invention, the auxiliary orifice may be smaller at its lower or discharge end than each of the feed orifices.

The invention is not limited to the details of the illustrative structures shown in the drawings and herein described as many modifications thereof and changes therein will readily occur to those skilled in the art.

What is claimed is:

1. Glass feeding apparatus comprising a container for molten glass having an open-topped well in its bottom and a feed orifice and an auxiliary orifice in the bottom of the well and adjacent to each other, and a refractory implement depending into the glass in the well for cooperation therewith to control downward flow of glass through the well to both said orifices and having its lower end adjacent to the level of and wholly within the confines of the upper end of said auxiliary orifice so that said implement will conduct directly into the auxiliary orifice all cords moving downwardly along the implement in the well from a higher level in the container.

2. Glass feeding apparatus as defined by claim 1 wherein said auxiliary orifice is defined by a substantially funnel-shaped wall and has a cross-sectional area at its upper end substantially greater than that of the feed orifice.

3. Glass feeding apparatus as defined by claim 1 wherein said implement tapers to a relatively sharp point at its lower end.

4. Glass feeding apparatus as defined by claim 1 wherein said implement is axially reciprocable and, in combination therewith, a refractory tubular member depending into the glass above the well in spaced concentric relation with said refractory implement, and means to rotate said refractory tubular member about its vertical axis.

5. Glass feeding apparatus as defined by claim 4 wherein said implement also is rotatable about its axis, and in combination therewith, means to rotate said implement about its axis in the direction opposite the direction of rotation of the refractory tubular member.

6. A glass feeding forehearth having a delivery chamber at its outer end and a glass flow channel communicating with the delivery chamber, said delivery chamber having an open-topped well in its bottom, said well having a bottom wall formed with a feed orifice in its rearward portion and an auxiliary orifice in front of the feed orifice, a vertically reciprocable and rotary refractory plunger depending into the glass in the well in axial alignment with the auxiliary orifice, and a rotary refractory tube depending into the glass above the well in spaced concentric relation with said refractory plunger.

7. A glass feeding forehearth having a delivery chamber at its outer end and a glass flow channel communicating with the delivery chamber, said delivery chamber having an open-topped well in its bottom, said well having a bottom wall formed with a feed orifice in its front portion and an auxiliary orifice rearwardly of the feed orifice, a vertically reciprocable and rotary refractory plunger depending into the glass in the well in axial alignment with the auxiliary orifice, and a rotary refractory tube depending into the glass above the well in spaced concentric relation with the plunger.

8. A glass feeding forehearth having a delivery chamber at its outer end and a glass flow channel communicating with the delivery chamber, said delivery chamber having an open-topped well in its bottom, said well having a bottom wall formed to provide a central auxiliary orifice and a plurality of feed orifices spaced radially from the central auxiliary orifice, a vertically reciprocable and rotary refractory plunger depending into the glass in the well in axial alignment with the auxiliary orifice, and a rotary refractory tube depending into the glass above the well in spaced concentric relation with said plunger.

9. The method of feeding molten glass from a supply body in a container which comprises passing glass from the supply body downwardly through a well in the bottom of the container to a plurality of adjacent orifices in the bottom of the well simultaneously, and directing to only one of said orifices such cords as pass downwardly into the well from an upper portion of the supply body.

10. The method of feeding molten glass which comprises providing a supply body of the glass in a container in position to submerge an open-topped well at the bottom of the container and to tend to issue by gravity through both a feed orifice and an adjacent auxiliary orifice in the bottom wall of the well, and controlling flow of molten glass from the supply body downwardly through said well and said orifices so as to divert from the glass passing to said feed orifice to the glass passing to the auxiliary orifice substantially all cords in the glass entering said well from a higher lever portion of the suppy body.

11. The method of feeding molten glass from a supply body which comprises establishing gravity flow of glass from the supply body through each of a plurality of adjacent orifices in the bottom of a glass feeding container, and acting locally on the glass of the supply body extending from the upper surface of said supply body to the vicinity of said orifices to concentrate in the glass flowing through only one of said orifices substantially all the cords carried by the glass arriving in the vicinity of said orifices.

12. The method of feeding molten glass which comprises establishing gravity flow of glass from a supply body through each of a plurality of adjacent orifices in the bottom of a well at the bottom of a glass feeding container for the supply body, and controlling flow of glass downward in the well to all of said orifices and at the same time directing cords from glass of an upper portion of the supply body into only one of said orifices by supporting a refractory implement in position to depend into the glass in the well in approximate axial alignment with and to a level adjacent to the wall of that particular orifice and rotating said refractory implement about its vertical axis to wind thereon cords from the adjacent glass so that said cords will be entrained with the glass moving downwardly next to said implement directly into the approximately axially aligned orifice beneath the implement.

13. The method of feeding molten glass which comprises establishing gravity flow of glass from a supply body through each of a plurality of adjacent orifices in the bottom of a well at the bottom of a glass feeding container for the supply body, and directing cords from glass of an upper portion of the supply body into only one of said orifices by supporting a refractory implement in position to depend into the glass in the well in approximate axial alignment with and to a level adjacent to the wall of that particular orifice, rotating said refractory implement about its vertical axis to draw thereto cords from the adjacent glass to position to be entrained with the downwardly moving glass next to said refractory implement, and rotating a refractory tube in the glass above the well in spaced concentric relation with said refractory implement to gather on the outer surface thereof cords from the adjacent glass and to direct such cords from the lower end of said tube downwardly and inwardly to the rotating refractory implement.

WILLIAM T. HONISS.

REFERENCES CITED

The following references are of record in the file of this patent:

UNITED STATES PATENTS

| Number | Name | Date |
|---|---|---|
| 1,612,756 | Tokunaga | Dec. 28, 1926 |
| 1,737,220 | Cramer | Nov. 26, 1929 |
| 1,737,525 | Soubier | Nov. 26, 1929 |
| 1,750,967 | Rule | Mar. 18, 1930 |
| 1,926,764 | Dorman | Sept. 12, 1933 |
| 2,050,205 | Bailey | Aug. 4, 1936 |
| 2,050,211 | Honiss | Aug. 4, 1936 |
| 2,310,290 | Honiss | Feb. 9, 1943 |
| 2,340,729 | Barker Jr. | Feb. 1, 1944 |